United States Patent [19]

Turner

[11] 4,061,714

[45] Dec. 6, 1977

[54] PROCESS FOR SEPARATING AN ACID FROM A GASEOUS MIXTURE

[75] Inventor: Mervyn Edward Dennant Turner, Stockton-on-Tees, England

[73] Assignee: Imperial Chemical Industries Limited, London, England

[21] Appl. No.: 617,402

[22] Filed: Sept. 29, 1975

[30] Foreign Application Priority Data

Oct. 14, 1974 United Kingdom ............... 44408/74

[51] Int. Cl.$^2$ ............................................. B01D 53/34
[52] U.S. Cl. .................................. 423/220; 423/223; 423/226; 423/229; 423/232
[58] Field of Search ............... 423/223, 224, 226–229, 423/232, 573

[56] References Cited

U.S. PATENT DOCUMENTS

| 1,719,726 | 7/1929 | Gollman | 423/223 |
| 3,099,535 | 7/1963 | Maezawa et al. | 423/573 |

FOREIGN PATENT DOCUMENTS

| 391,786 | 5/1933 | United Kingdom | 423/226 |

*Primary Examiner*—Earl C. Thomas
*Attorney, Agent, or Firm*—Cushman, Darby & Cushman

[57] ABSTRACT

A process for separating acid gases from gaseous mixtures by absorption in alkaline solutions such as potassium carbonate solution wherin corrosion caused by the absorbing solution is reduced by inclusion therein of an aromatic compound. The aromatic compound has at least one nitro group and at least one hydroxyl group substituted in the same benzene nucleus. The invention is particularly applicable when the absorbent is a potassium carbonate solution activated by arsenic ions.

8 Claims, No Drawings

PROCESS FOR SEPARATING AN ACID FROM A GASEOUS MIXTURE

This invention relates to a process for separating an acid gas such as carbon dioxide from a gaseous mixture containing the acid gas of the kind wherein the acid gas is absorbed in an alkaline absorbing solution and the absorbing solution is subsequently regenerated by separating the acid gas therefrom.

The apparatus, such as vessels and associated pipework, in which a process of the kind described is conducted is generally formed from mild steel, although stainless steel may also be used in some instances, and surfaces in contact with the absorbing solution are subject to corrosion. This corrosion may be general corrosion in the case of both mild steel and stainless steel surfaces and may also be stress corrosion in the case of mild steel surfaces when, as is often the case, the absorbing solution contains arsenite and/or arsenate ions.

According to the present invention we provide a process of the kind described wherein the absorbing solution comprises a small amount of an aromatic compound having at least one nitro group and at least one hydroxyl group substituted in the same benzene nucleus or a compound formed from said aromatic compound in the solution.

In a process of the kind described the absorbing solution is suitably an aqueous solution of an alkaline salt of ammonium or an alkali metal, for example a solution of a carbonate, phosphate, borate or phenate of sodium, potassium or ammonium. The absorbing solution generally used is potassium carbonate solution. Frequently the absorbing solution contains an activator to improve the rate of mass transfer of the acid gas into the absorbing solution. Examples of activators which may be used include arsenite and/or arsenate ions, ethanolamines such as monoethanolamine or diethanolamine or others such as ethylamino ethanol whose use is described in our UK Patent specification No. 1,218,083, or amino acids such as glycine or others such as N-ethyl-$\beta$-alanine whose use is described in our UK Patent specification No. 1,305,718 or N-ethyl glycine whose use is described in our UK Patent specification No. 1,306,853.

Usually the absorbing solution contains 15% to 50%, especially 25% to 35%, by weight of the alkaline salt. When present the activators are present in amounts which vary depending upon the activator used.

The absorption step of the process is generally carried out at a solution temperature of 50° to 120° C especially 80° to 115° C. During the regeneration step the solution temperature is usually between 50° and 130° C, especially 100° to 125° C.

Arsenic is often present in the absorbing solution as $As^{3+}$ and $As^{5+}$ ions having been introduced by adding an arsenic compound such as arsenious oxide or an arsenite to the solution. When used as an absorption activator, arsenic ions are usually present in the absorbing solution in amounts between 6% and 14%, especially 10% to 12%, by weight, the $As^{3+}$ ions predominating. Arsenic ions may also be present solely for the inhibition of general corrosion, for example in potassium carbonate solutions containing other activators, in which case the amount of arsenic ion present is typically between 0.1% and 1% by weight. Other inhibitors of general corrosion which have been employed include vanadate salts.

We have found that stress corrosion cracking occurring in stressed metal, eg mild steel surfaces, in contact with absorbing solutions containing arsenite and/or arsenate ions when these are used in processes of the kind described is promoted by arsenic ions present in the solution. We believe that when the corrosion potential (ie the electrochemical potential of a metal surface in contact with a solution measured relative to a standard reference potential scale, eg the hydrogen electrode scale, and representing the condition where the anodic and cathodic half cell reactions are proceeding at the same current density) of a stressed metal surface in contact with the absorbing solution is below a certain value the surface is susceptible to stress corrosion cracking. In our co-pending UK patent application No 22356/73 (Belgian Pat. No 814,484) we describe a method for controlling stress corrosion cracking in these circumstances. In this the corrosion potential is monitored and when it is found to have fallen below a critical value depending upon the carbonation index of the absorbing solution, the proportion of antimony and/or ferric ions in the solution is increased. The carbonation index $(CO_2)/(K_2O)$ of the absorbing solution is defined as the ratio of the number of gram moles of carbon dioxide in the solution to the number of gram moles of potassium expressed as $K_2O$, therein.

We believe that the presence in the absorbing solution used in a process of the kind described of an aromatic compound having at least one nitro group and at least one hydroxyl group substituted in the same benzene nucleus or a compound formed from said aromatic compound in the absorbing solution will inhibit both general corrosion and stress corrosion cracking. Unlike arsenite and/or arsenate ions such compounds do not promote stress corrosion cracking.

The degree of effectiveness of corrosion inhibition depends upon the number of nitro groups substituted in the benzene nucleus, trinitro-compounds being more effective than dinitro compounds which are themselves more effective than mononitrocompounds. The benzene nucleus may additionally be substituted by a carboxyl group.

A very effective compound is 2, 4, 6-trinitrophenol. Other effective compounds include:

2-nitrophenol
3-nitrophenol
4-nitrophenol
2,4-dinitrophenol
2,5-dinitrophenol
2,6-dinitrophenol
Nitrosalicylic acid
3,5-dinitrosalicylic acid
Nitronaphthol Preferably the aromatic compound is added to the absorbing solution in amounts greater than 0.01% by weight, particularly between 0.02% and 1% and especially 0.02% and 0.2% by weight. If desired ferric ions may also be present for example in amounts between 100 and 300 ppm. The ferric ions may be introduced either by adding a ferric salt eg $Fe_2(SO_4)_3$ or by oxidising ferrous ions already present in the solution by blowing air therethrough.

The invention is illustrated by the following Example.

EXAMPLE

Stress Corrosion Tests on Absorbing Solutions for Separating $CO_2$ from a Gaseous Mixture Mild steel tensile test pieces were subjected to constant strain at a strain rate of $10^{-6}$ sec. whilst immersed in absorbing solutions at 98° to 102° C. The corrosion potential of each specimen against a standard calomel electrode was recorded continuously during the experiment and the specimen was sectioned and examined microscopically after fracture. The absorbing solutions comprised a base solution containing:

1. Potassium carbonate — 30%
2. N-ethyl glycine — 5%
3. Arsenious Oxide — 0.5%
4. Ferric sulphate in an amount equivalent to a ferric ion concentration of 200 ppm.

To the base absorbing solution was added the aromatic compound 2, 4-dinitrophenol as inhibitor in various proportions. The results are given in the following Table:

TABLE

| % Inhibitor | Corrosion Potential MVs | Type of fracture | Microscopic observations |
|---|---|---|---|
| 0 | −770 to −820 | Brittle | Stress corrosion cracks |
| 0.2 | −480 to −620 | Ductile | No cracking |
| 0.02 | −575 to −625 | Ductile | No cracking |
| 0.01 | −840 to −880 | Brittle | Stress corrosion cracks |

The results show that the occurence of stress corrosion cracking was greatly reduced by addition of 2,4-dinitrophenol in appropriate amounts to the base absorbing solution.

I claim:

1. In a process for separating carbon dioxide from a gaseous mixture by absorbing it in an aqueous alkaline absorbing solution of a salt of ammonium or of an alkali metal and regenerating the said solution, the improvement which comprises inhibiting the corrosion of mild steel or stainless steel surface in contact with the said solution by having present therein an amount between 0.02% and 1.0% by weight of an aromatic compound having at least one nitro group and at least one hydroxyl group substituted in the same benzene nucleus or a compound formed from the said aromatic compound in the solution and an amount sufficient to activate absorption of an activator selected from the group consisting of arsenite ions, arsenate ions, monoethanolamine, diethanolamine, ethylamino ethanol, glycine, N-ethyl-$\beta$-alanine and N-ethyl glycine.

2. A process according to claim 1 wherein the absorbing solution is potassium carbonate solution.

3. A process according to claim 1 wherein the absorbing solution contains 25% to 35% by weight of the alkaline salt.

4. A process according to claim 1 wherein the absorption step is carried out at a solution temperature of 80° to 115° C.

5. A process according to claim 1 wherein the aromatic compound is selected from the group consisting of 2, 4, 6-trinitrophenol; 2-nitrophenol; 3-nitrophenol; 4-nitrophenol; 2, 4-dinitrophenol; 2,5-dinitrophenol; 2,6-dinitrophenol; nitrosalicylic acid; 3, 5-dinitrosalicylic acid; nitronaphthol and a compound formed from any of these aromatic compounds in the absorbing solution.

6. A process according to claim 1 wherein said absorbing solution contains 25 to 35% potassium carbonate, the absorption is carried out at a solution temperature of 80° to 115° C and the regeneration step is carried out at a solution temperature of 100° to 125° C.

7. In a process for separating carbon dioxide from a gaseous mixture by absorbing carbon dioxide in an aqueous alkaline absorbing solution of a salt of ammonium or of an alkali metal and regenerating the said solution, the improvement which comprises inhibiting the corrosion of mild steel or stainless steel surface in contact with the said solution by having present therein an amount between 0.02% and 1.0% by weight of an aromatic compound having at least one nitro group and at least one hydroxyl group substituted in the same benzene nucleus or a compound formed from the said aromatic compound in the solution and an amount sufficient to activate absorption of an arsenic compound.

8. In a process for separating carbon dioxide from a gaseous mixture by absorbing it in an aqueous alkaline absorbing solution of a salt of ammonium or of an alkali metal and regenerating the said solution, the improvement which comprises inhibiting the corrosion of mild steel or stainless steel surface in contact with the said solution by having present therein an amount between 0.02% and 1.0% by weight of an aromatic compound having at least one nitro group and at least one hydroxyl group substituted in the same benzene nucleus or a compound formed from the said aromatic compound in the solution and an amount from 0.1% to 1% by weight of arsenic ion for inhibition of general corrosion.

* * * * *